United States Patent [19]

Basch et al.

[11] 4,339,662

[45] Jul. 13, 1982

[54] SAFETY SELECTOR SWITCH INCLUDING PHOTOELECTRIC DETECTION

[75] Inventors: William J. Basch; Charles D. Moore, both of Indianapolis, Ind.

[73] Assignee: The United States of America as represented by the Secretary of the Navy, Washington, D.C.

[21] Appl. No.: 188,654

[22] Filed: Sep. 19, 1980

[51] Int. Cl.³ .............................................. G01D 5/34
[52] U.S. Cl. ...................................... 250/229; 74/504
[58] Field of Search ........................... 250/229, 237 R; 340/365 P; 74/504, 526, 548, 565

[56] References Cited

U.S. PATENT DOCUMENTS 2,917,942  12/1959  Jarrett et al. ........................... 74/504
3,139,769  7/1964  Gauchat ................................. 74/565
4,250,379  2/1981  Hansen ................................ 250/229

Primary Examiner—David C. Nelms

[57] ABSTRACT

A safety selector switch for preventing accidental energization of an electrical circuit. A plurality of circular discs, each having a cut-out portion in its periphery, are mounted on a shaft of an electrical component, such as a rotary switch. A second shaft is provided which is translatable in a direction parallel to the longitudinal axis of the shaft of the electrical component, and an arm is provided on said second shaft and is selectively positionable in each cut-out portion of said circular discs to limit rotation of the shaft of the electrical component. Continued rotation of the shaft of the electrical component can only be made by alternately rotating said shaft of said electrical component and translating said second shaft to move said arm to a cut-out portion of an adjacent annular disc. One of said circular discs is of greater diameter than the remaining discs and is provided with a second cut-out portion to form a passageway for light. A light source is positioned on one side of the greater diameter disc and a light detector is positioned on the opposite side of the greater diameter disc such that light from said light source can only reach the light detector by passing through the second cut-out portion.

5 Claims, 16 Drawing Figures

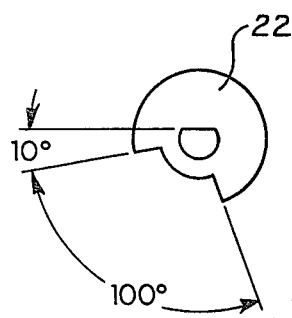
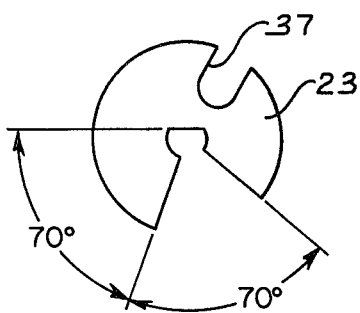
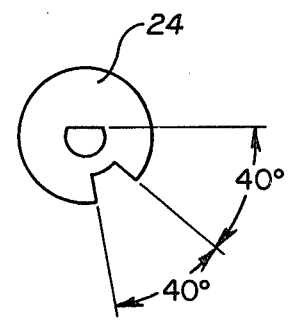
Fig. 2     Fig. 3     Fig. 4
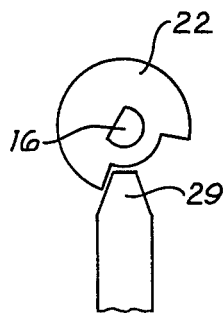
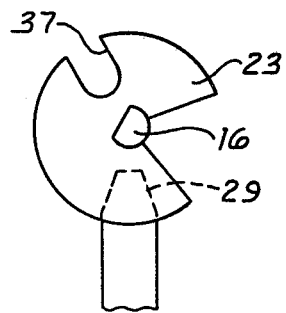
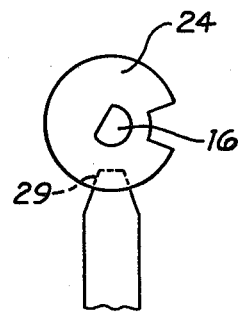
Fig. 5(a)     Fig. 5(b)     Fig. 5(c)
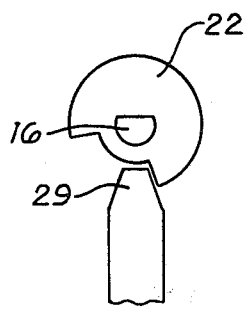
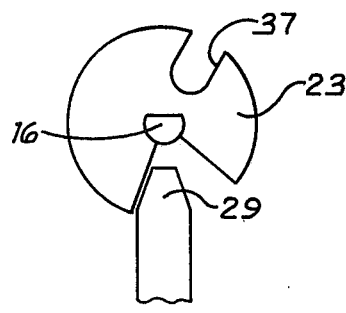
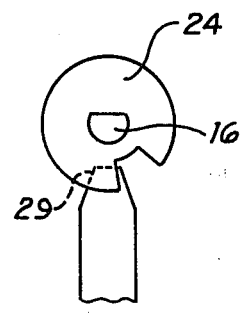
Fig. 6(a)     Fig. 6(b)     Fig. 6(c)
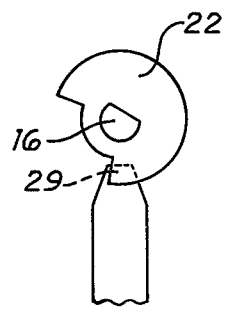
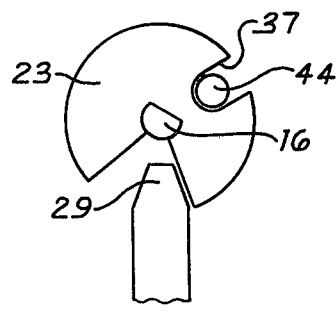
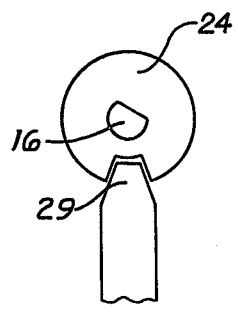
Fig. 7(a)     Fig. 7(b)     Fig. 7(c)

SAFETY SELECTOR SWITCH INCLUDING PHOTOELECTRIC DETECTION

CROSS-REFERENCE TO RELATED APPLICATION

Patent application of James D. Hansen, Jr., entitled, "Safety Selector Switch", Ser. No. 068,789, filed Aug. 22, 1978, now U.S. Pat. No. 4,250,379.

BACKGROUND OF THE INVENTION

The present invention relates to a safety selector switch for preventing accidental energization of an electrical circuit by requiring a very definite sequence of operations in order to rotate an electrical device, such as a rotary switch, to its various positions.

Control panels, such as those used in aircraft, often have large numbers of electrical components such as switches and potentiometers, and because of space limitations these components are often mounted closely together. Consequently, it is very likely that a component may be unintentionally rotated when it should not be, which could create an unsafe condition.

Various locking devices have been provided to prevent accidental rotation of a rotary device. One well-known device is described in U.S. Pat. No. 2,917,942, "Rotary Locking Device", which issued Dec. 22, 1959, to John W. Jarrett and Everett L. Rice. This patented device comprises a shaft that is axially slidably attached to the existing shaft of an electrical component, and the attached shaft has at least one lug that is engageable with a plurality of slots in a shaft bushing. The attached shaft is resiliently biased outwardly to retain the lugs within one of the slots and when in this position, the attached shaft is locked from rotation. When it is desired to rotate the attached shaft, it is first necessary to move it inwardly until the lug is disengaged from the slot. The shaft is then free to be rotated. However, the disadvantage of this patented device resides in the fact that once the attached shaft is moved inwardly, then the shaft is free to be rotated to any angular position and thus the shaft can be accidentally rotated to a position that would create an unsafe condition. For example, in a bomb arming system it may be necessary to turn a shaft to several warm-up positions, or test positions, before turning to an arming position and no heretofore known device can provide the necessary safety function of permitting rotation to a plurality of positions and providing locking means for each position.

Another safety locking device for a rotary switch is described in U.S. Pat. No. 3,139,769, entitled "Rotary Locking Device", which issued July 7, 1964, to Richard H. Gauchat. In this patented device, a housing is attached to the threaded portion of a rotary switch and a shaft carried by the housing is axially slidably attached to the existing shaft of a rotary switch. A pair of locking pins are provided on the attached shaft and these pins are engageable with a locking plate which limits the amount of rotational travel of the attached shaft. In order to obtain additional rotation, the pins must be shifted axially, that is, an alternating push-pull motion is required in order to turn the attached shaft to its various positions. Thus, accidental rotation can be avoided, as a very definite sequence of operation is required in order to turn a rotary switch to its various positions.

In the above-identified patent application of James D. Hansen, Jr., there is disclosed a safety selector switch which requires alternating rotation of a first shaft and translation of a second shaft for operation and, upon reaching a terminal position, first and second light sources emit light to first and second light detectors to close an energizing circuit. Light from the first light source can pass through an aperture in a disc only after the disc has been rotated to a predetermined position. The light source which provided light that passed through an aperture in a disc is a relatively large distance from the light detector and, during testing, it was determined that the switch would not be operable at a temperature above 56 degrees C.

SUMMARY OF THE INVENTION

The present invention relates to a safety selector switch for preventing accidental energization of an electrical circuit such as a weapon arming circuit in a military aircraft. A plurality of circular discs, each having a cut-out portion in its periphery, are mounted on a shaft of an electrical component, such as a rotary switch. A second shaft is provided which is translatable in a direction parallel to the longitudinal axis of the shaft of the electrical component, and an arm is provided on said second shaft and is selectively positionable in each cut-out portion of said circular discs to limit rotation of the shaft of the electrical component.

After the shaft of the electrical component has been turned a partial revolution, the arm on the second shaft reaches the end of the cut-out portion and is prevented from further rotation. The second shaft is then translated so that the arm thereon enters the cut-out portion in an adjacent circular disc and the shaft of the electrical component can again be rotated.

One of the circular discs is of larger diameter than the other discs and is provided with a second cut-out portion which provides a passageway for light. A first light source is positioned adjacent one side of the larger diameter circular disc and a light detector is placed adjacent the opposite side of the larger diameter circular disc such that light will pass through the second cut-out portion to shine upon the light detector when the larger diameter disc has been rotated to a predetermined position. A second light source and a second light detector are also attached on opposite sides of the housing and a shutter is provided on the second shaft to block passage of light from the second light source to the second light detector until the second shaft is moved outwardly to its most forward position. When both light detectors receive signals, the function of the final switch position is achieved.

It is therefore a general object of the present invention to provide a safety mechanism to an electrical component which will prevent accidental energization of an electrical circuit.

Another object of the present invention is to provide a safety selector switch which will be operable in an elevated temperature environment.

Another object of the present invention is to provide a sequence of operations in order to rotate a shaft of an electrical component.

Still another object of the present invention is to provide light emitters and light detectors to assure that a proper sequence of operations has been performed to rotate a shaft of an electrical component to a final energizing position.

BRIEF DESCRIPTION OF THE DRAWINGS

FIG. 2 is a top plan view of a first stop plate;

FIG. 3 is a top plan view of an enlarged diameter second stop plate;

FIG. 4 is a top plan view of a third stop plate;

FIGS. 5(a), 5(b), and 5(c) are diagrammatic views showing stop plates in a first position;

FIGS. 6(a), 6(b), and 6(c) are diagrammatic views showing stop plates in a second position;

FIGS. 7(a), 7(b), and 7(c) are diagrammatic views showing stop plates in a third position;

DESCRIPTION OF THE PREFERRED EMBODIMENT

Figure 1:
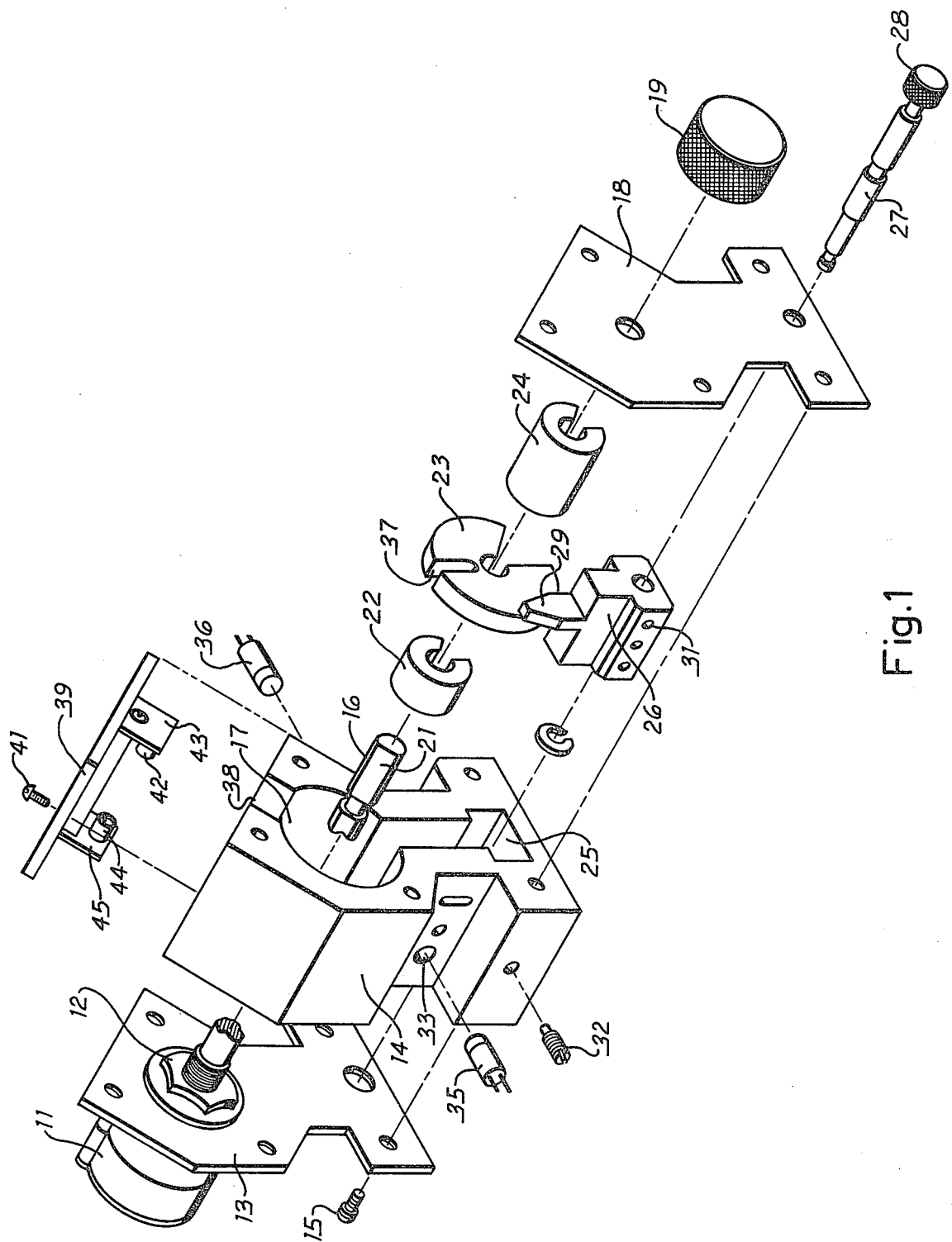
FIG. 1 is an exploded view of a preferred embodiment of the present invention.

Referring now to FIG. 1 of the drawings, an electrical component 11, such as a rotary switch, is attached by a nut 12 to a first cover plate 13 which, in turn, is connected to a housing 14 by screws 15. Component 11 has a shaft 16 which extends through an opening 17 in housing 14 and through a second cover plate 18. A knob 19 is provided on the end of shaft 16 to operate the electrical component by turning shaft 16. Shaft 16 is provided with a flat surface 21 thereon, and three stop plates 22, 23, and 24 are positioned on shaft 16. Each stop plate has an aperture with a flat surface which prevents relative rotation between the stop plates and shaft 16. Housing 14 is provided with a through T-slot 25 which connects with opening 17 in housing 14.

A translational shutter 26, which is also T-shaped, is slidably mounted on T-slot 25 and a shaft 27, having a knob 28 thereon, is attached to shutter 26 to move shutter 26 in T-slot 25. Shutter 26 has an arm 29 which extends into opening 17 in housing 14. Shutter 26 is provided with indentations 31 which are engaged by a spring detent mechanism 32 to hold shutter 26 in its various positions.

Housing 14 has a pair of aligned holes 33 and 34 which communicate with T-slot 25 and a light emitting diode 35 is mounted in hole 33 and a light detecting diode 36 is mounted in hole 34.

Figure 10:
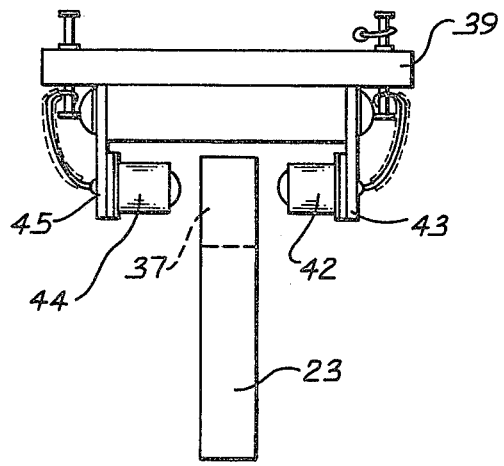
FIG. 10 is a side view showing a light emitting diode and a light detecting diode assembly.

As best seen in FIGS. 1, 3, and 10 of the drawings, stop plate 23 is larger in diameter than stop plates 22 and 24, and a second cut-out or slot 37 is provided in stop plate 23 and serves as a passageway for light. Housing 14 is provided with a side opening 38 that provides access to opening 17, and opening 38 is closed by a cover plate 39 which is attached to housing 14 by screws 41. A light emitting diode 42 is attached to cover plate 39 by means of bracket 43 and a light detecting diode 44 is attached to cover plate 39 by means of bracket 45.

Figure 8:
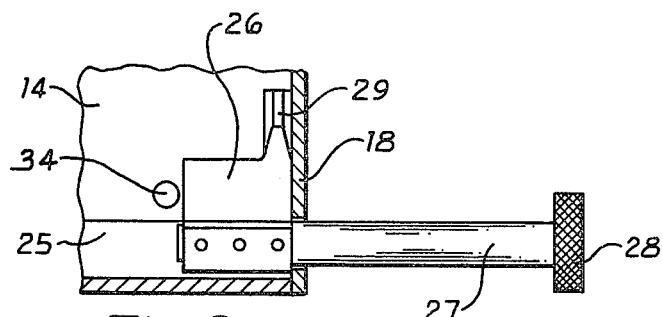
FIG. 8 is a side view of a shutter and stop arm.

Referring now to FIG. 8 of the drawings, it can be seen that when shaft 16 of rotary switch 11 has been turned to a final position (as illustrated by FIGS. 7(a), 7(b), and 7(c)), shutter 26 can be moved to its final position by pulling on knob 28 which is attached to shaft 27, and, in this final position, light from diode 35 can pass through holes 33 and 34 to diode 36.

Figure 9:
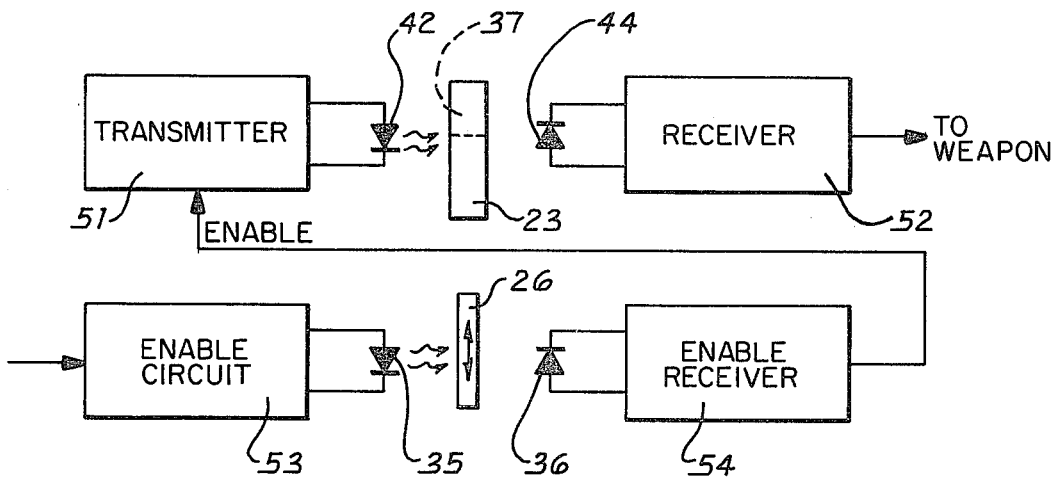
FIG. 9 is a circuit diagram showing light emitters and light receivers.

Referring now to FIG. 9 of the drawings, the function of the diodes can readily be seen. A connection between transmitter 51 and receiver 52 cannot be made until stop plate 23 is rotated to its final position whereby slot 37 becomes aligned with diodes 42 and 44 and light can pass through slot 37 in stop plate 23. However, diode 42 is off because an enabling signal has not been received by transmitter 51 because shutter 26 has not been moved and light cannot pass from diode 35 to diode 36. As best shown in FIGS. 7(b) and 7(c), however, when slot 37 is aligned with diodes 42 and 44, arm 29 is in position to be moved to its final position, and upon movement, shutter 26 clears the passage between holes 33 and 34 and light can pass from diode 35 to diode 36. A signal then passes from enable circuit 53 to receiver 54 which, in turn passes a signal to transmitter 51 and then to receiver 52.

OPERATION

By way of example, rotary switch 11 might be a four position switch and, in one military application, these positions were designated as "OFF", "MONITOR", "SAFE", and "ARMED". The operation of the present invention will now be described using these designations.

Referring to FIGS. 5, 6, and 7 of the drawings, FIG. 5(a) shows the positions of stop plate 22 and arm 29 when rotary switch 11 is in the "OFF" position. From this "OFF" position, switch 11 can then be turned to "MONITOR" and then directly to "SAFE" by turning knob 19 in a clockwise direction. Likewise, the switch can be turned to "MONITOR" and then back to "OFF" by merely turning knob 19 in the proper directions. As shown in FIG. 5(b), arm 29 must stay positioned in the cut-out portion of stop plate 22 as stop plate 23 prevents any outward movement of arm 29 by a force applied to shaft 27.

FIG. 6(b) shows the position of stop plate 22 and arm 29 when rotary switch 11 has been turned to the "SAFE" position. It can be seen that shaft 16 cannot be turned any further in a clockwise position, as arm 29 is positioned as one end of the cut-out. As previously stated, shaft 16 could be turned in a counterclockwise direction to return switch 11 to either a "MONITOR" or "OFF" position. FIG. 6(b) shows that arm 29 is aligned with the cut-out in stop plate 23 and, by pulling outwardly on knob 28 which is attached to shaft 27, arm 29 is moved from being aligned with stop plate 22 to now being aligned with stop plate 23. As shown in FIG. 6(c) the outward movement of arm 29 is limited by stop plate 24, and arm 29 can thus be moved only one position, that is, from alignment with stop plate 22 to alignment with stop plate 23. When arm 29 is moved into the cut-out portion of stop plate 23, rotary switch 11 can then be turned in a clockwise position to the "ARMED" position, which is shown in FIG. 7(b). When stop plate 23 reaches the position shown in FIG. 7(b), further clockwise rotation is prevented and slot 37 in stop plate 23 provides a light passage between diodes 42 and 44.

Referring now to FIG. 9 of the drawings, although stop plate 23 has been rotated to align slot 37 with diodes 42 and 44, diode 42 does not emit as the circuit is still not complete. As shown in FIG. 7(c), arm 29 is now aligned with the cut-out in stop plate 24 and arm 29 can be moved outwardly from alignment with stop plate 23 and into alignment with stop plate 24. As best shown in FIG. 8 of the drawings, when arm 29 is moved into alignment with stop plate 24, shutter 26 clears holes 33 and 34 and light can pass from diode 35 to diode 36.

It can thus be seen that going from an "OFF" position of rotary switch 11 to an "ARMED" position requires four separate operations, that is, rotation of knob 19, translation of knob 28, another rotation of knob 19, and, finally, another translation of knob 28. As this operation involves the sequential turning of one knob, followed by the pulling of a different knob, with the sequence then being repeated, it can be seen that the accidental arming of a weapon is not likely to occur.

While the operation of present invention has been described in relation with a particular arming switch, the present selector switch can have use with any device where inadvertent switching is to be avoided.

Obviously many modifications and variations of the present invention are possible in the light of the above teachings. It is therefore to be understood that the invention may be practiced otherwise than as specifically described.

We claim:

1. A locking device for an electrical component comprising,
    a housing attached to a rotatable shaft of an electrical component,
    a plurality of circular stop plates, one of which is of greater diameter than any other circular stop plate, said circular stop plates being mounted on said rotatable shaft within a bore of said housing, each said circular stop plate having a first cut-out portion in its periphery and said stop plate of greater diameter having a second cut-out portion in its periphery providing a passageway for light,
    a second shaft slidably attached in said housing and movable in a direction parallel to the longitudinal axis of said rotatable shaft and having an arm selectively positionable in said first cut-out portions of said stop plates to limit rotation of said rotatable shaft, said cut-out portions in each stop plate being arranged to permit successive translations of said arm into cut-outs of adjacent stop plates after each stop plate has been rotated to a predetermined position,
    light emitting means including a first light source positioned adjacent one side of said stop plate of greater diameter, and
    light detecting means including a first light detector positioned adjacent the opposite side of said stop plate of greater diameter whereby light from said first light source must pass through said second cut-out portion in said stop plate of greater diameter to shine-upon said first light detector.

2. A locking device for an electrical component as set forth in claim 1 wherein said housing has a side opening into said bore of said housing and said first light source and said first light detector are spaced apart and attached to a cover for closing said opening.

3. A locking device for an electrical component as set forth in claim 1 wherein said light emitting means includes a second light source attached to said housing and said light detecting means includes a second light detector attached to said housing opposite said second light source and means on said second shaft for blocking passage of light from said second light source to said second light detector until said second shaft is moved to a predetermined position.

4. A locking device for a rotary switch comprising,
    a housing attached to a rotatable shaft of a rotary switch,
    at least three circular stop plates, one of which is of greater diameter than at least two other circular stop plates, said circular stop plates being mounted on said rotatable shaft within a bore of said housing, each of said at least three circular stop plates having a first cut-out portion in its periphery and said stop plate of greater diameter having a second cut-out portion in its periphery providing a passageway for light,
    a second shaft slidably attached in said housing and movable in a direction parallel to the longitudinal axis of said rotatable shaft and having an arm selectively positionable in said first cut-out portions of said stop plates to limit rotation of said rotatable shaft, said cut-out portions in stop plate being arranged to permit successive translations of said arm into cut-outs of adjacent stop plates after each stop plate has been rotated to a predetermined position,
    a first light source positioned adjacent one side of said stop plate of greater diameter,
    a first light detector positioned adjacent the opposite side of said stop plate of greater diameter whereby light from said first light source must pass through said second cut-out portion in said stop plate of greater diameter to shine-upon said light detector,
    a second light source attached to said housing,
    a second light detector attached to said housing opposite said second light source, and
    a shutter attached to said second shaft for blocking passage of light from second second light source to said second light detector until said second shaft is moved to a predetermined position.

5. A locking device for a rotary switch as set forth in claim 4 wherein said housing has a side opening into said bore of said housing and said first light source and said first light detector are spaced apart and attached to a cover for closing said opening.

* * * * *